Oct. 20, 1959 G. W. KARLSRUHER 2,909,067

MECHANICAL DRIVE AND INDICATOR

Filed June 6, 1958

INVENTOR
GERALD W. KARLSRUHER
BY Theodore Jay Jr.
ATTORNEY

United States Patent Office 2,909,067

Patented Oct. 20, 1959

2,909,067

MECHANICAL DRIVE AND INDICATOR

Gerald W. Karlsruher, New York, N.Y., assignor, by mesne assignments, to Sylvania Electric Products Inc., Wilmington, Del., a corporation of Delaware Application June 6, 1958, Serial No. 740,217

5 Claims. (Cl. 74—10.9)

My invention relates to apparatus for driving a rotatable device and for indicating the position thereof.

There are various applications wherein it is desired to drive a device rotatable on a shaft through an angular displacement and to indicate the position of that device with respect to an initial position thereof. One such application is in radio receivers wherein the tuning condenser is rotated through an angular dsplacement of approximately 180°. In such receivers it is common practice to employ string or belt drives between either of both the tuning knob and condenser and the condenser and dial indicator.

Such an arrangement has various inherent disadvantages. Among these are difficulty of assembly during manufacture, sliding or stretching of the belt or string on the pullies during the tuning operation and frequent breaking of the string or belt. The result is a tedious repair operation and consequent expense.

Furthermore, the tuning of conventional receivers is generally undesirable in that a given degree of rotation of the tuning knob will rotate the tuning condenser through a broader band of frequenciese at the higher frequency region of the dial than at the lower frequency region. This renders proper tuning difficult and critical when tuning at the higher frequencies, while the tuning at the lower frequencies is broader than desirable.

I have discovered new and improved driving and indicating apparatus which overcomes the above disadvantages.

Accordingly, it is an object of this invention to eliminate the necessity for frequent repairs resulting from the common breakage of belts or strings employed to drive a device rotatable on a shaft and to indicate the position thereof.

Another object is to eliminate the undesirable stretching and slipping of the belt or string employed between a manual drive shaft, the device to be driven thereby and the indicator therefor.

A further object is to simplify the manufacturing operation of electronic equipment pertaining to installation of the tuning and indicating mechanism therein.

These and other objects of the invention will either be explained or will become apparent hereinafter.

In accordance with the principles of my invention, I provide apparatus for rotating a first shaft about its axis at a variable angular velocity when a second shaft is rotated about its axis at a constant angular velocity, the axes of said first and second shafts being substantially parallel but separated from one another. The apparatus includes a first member secured to the first shaft and having therein a slot which extends in a direction substantially perpendicular to the axis of the first shaft and is displaced to one side of the first shaft. A second member is secured to the second shaft and carries a pin which is disposed to one side of the second shaft and extends in a direction substantially parallel to the second shaft. The pin is constrained within the slot of the first member. When the second member is rotated about the axis of the second shaft, the pin moves in the slot only in the direction in which the slot extends, thereby imparting angular motion to the first member and the first shaft.

Provision is made for indicating the position of the first shaft at any given time, such indicating means being secured directly to the second member in one embodiment of the invention. In another embodiment of the invention, the indicating means is located at a point remote from the first shaft and is coupled thereto by means of a suitable linkage arrangement. In still another embodiment of the invention, the apparatus is modified to provide a large angular deviation of the indicating means for a given angular deviation of the first shaft.

Illustrative embodiments of the invention will now be described in detail with reference to the accompanying drawings wherein.

Figure 1:
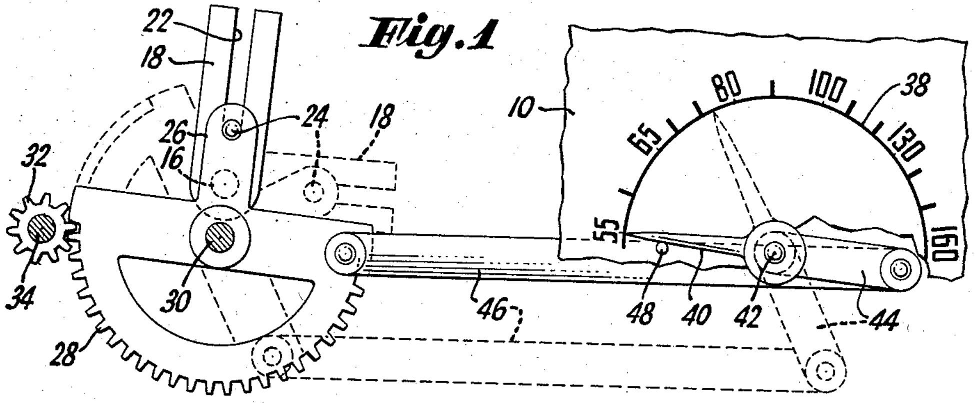
Fig. 1 depicts a side view of one embodiment of the invention with the movable mechanism thereof shown in two positions.
Figure 2:
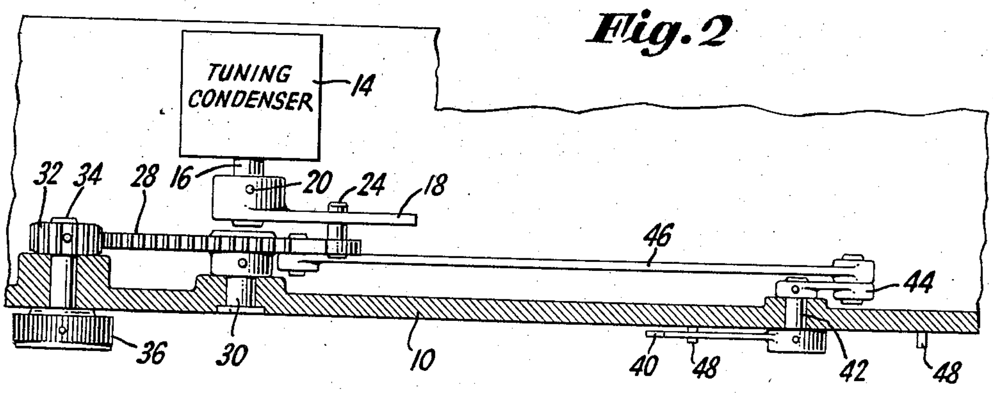
Fig. 2 represents a plan view of Fig. 1.

Referring now to Figs. 1 and 2, there is shown the front panel 10 and chassis 12 of a radio receiver. Mounted on the chassis and shown in block form is a device to be rotated, such as a variable condenser 14, having a first shaft 16. A first or slotted member 18 is secured to the first shaft 16 by a set-screw 20, the slot therein being designated at 22. The slot has parallel sides and engages a pin 24. The pin 24 is mounted on a lever arm 26, which is a part of a second member or gear section 28, mounted on a second shaft 30 and rotatable about the axis thereof. The axis of the condenser-shaft 16 is substantially parallel to, but separated from the axis of the supporting shaft 30 for the gear section. The teeth of the gear section 28 are meshed with the teeth of a driving gear 32, the latter being supported by a shaft 34 and rotatable about the axis thereof. This shaft also carries a knob 36 for manually driving the mechanism to change the position of the condenser 14.

Indicating means are further provided for indicating the position of the condenser with respect to an initial position thereof. Such means include a dial 38 secured to the front panel 10 of the receiver and a pointer 40 associated with the dial. The pointer is mounted to rotate about the axis of a shaft 42 passing through the panel 10. The shaft 42 is connected to the gear section 28 by means of two straight links 44 and 46, allowing the pointer to rotate as the knob 36, gear section 28 and tuning condenser 14 rotate, to indicate the position of the condenser.

As the driving gear 32 is turned by knob 36, the gear section 28 is forced to rotate. The pin 24, mounted on the lever arm 26 rotates with the gear section, causing the slotted member 18 to rotate and thereby rotating the shaft 16 of the tuning condenser. By means of the linkage 44 and 46, the pointer 40 will indicate on the dial 38 the position of the tuning condenser shaft at any given setting.

Since the shafts 16 and 30 are out of axial alinement with each other, the pin 24 will move along the slot 22 as the mechanism rotates. The tolerance between the width of the slot and the diameter of the pin should be as small as practical, so that there will be no "play" between the slot and the pin; this will insure relative motion between the slot and the pin only in the direction in which the slot extends.

An important feature of my invention is that the motion imparted to the condenser shaft 16 has progressively changing angular velocity as the knob 36 is rotated at constant angular velocity. This results from the shafts 16 and 30 being out of axial alinement with each other.

By locating the axis of the shaft 16 on a line between the axis of the shaft 30 and the pin 24 when the gear section is at its initial or starting position as shown by the solid lines in Fig. 1, the angular velocity of shaft 16 will progressively decrease as the gear section 28 is rotated at constant velocity for 180°. This follows since the pin 24 moves progressively further from the center of rotation of the slotted member 18 as the latter rotates with its shaft 16. This variable velocity drive feature is highly advantageous when utilized to tune a radio receiver. It is well known for example that when tuning a conventional receiver, the tuning at the high frequency end of the dial is often difficult and critical because at that end a greater frequency range is traversed than at the low frequency end for a given angular rotation of the tuning knob. By arranging my mechanism so that the tuning condenser and indicator are set at the low frequency end when the slotted member is in the position shown by solid lines in Fig. 1, and by then selecting the axis of rotation of the slotted member 18 on the line between the pin 24 and the axis of rotation of the gear section 28, a given angular movement of the tuning knob will result in a progressively smaller angular movement of the condenser and pointer as they are rotated approximately 180° toward the high frequency end of the dial. Critical tuning at the high frequency end is therefore eliminated.

In order to prevent "dead spots" at the extremes of rotation of my mechanism, i.e. spots where binding action would occur during rotation, stops 48 may be positioned to limit the movement of the link 44 to somewhat less than 180°, say 170°. This will also reduce the condenser rotation to only 170°. If desired, however, the condenser can be made to rotate 180° by making the distance from the axis of rotation of the gear section 28 to the pin 24 somewhat shorter than the link 44.

Figure 3:
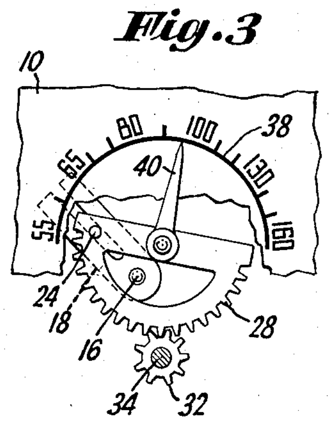
Fig. 3 shows another embodiment of the invention.

The arrangement shown in Fig. 1 is very desirable in that it allows positioning of the tuning knob at any desired location from the dial and tuning condenser. If desired, however, the knob may be located close to the dial by modifying the invention as shown in Fig. 3. It will be seen that the two connecting links 44 and 46 have been dispensed with in this embodiment and that the pointer 40 is secured directly to the gear section 28. This embodiment of the invention is therefore somewhat less expensive and has the further advantage that there can be no "dead spots." The feature of variable angular velocity condenser movement for constant angular velocity drive is however preserved.

Figure 4:
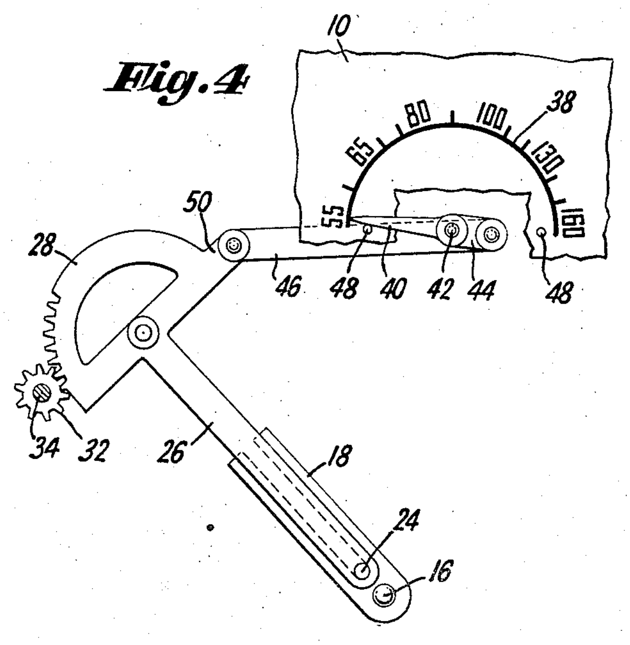
Fig. 4 shows still a further embodiment of the invention.

Fig. 4 shows a still further embodiment of the invention wherein the pin 24 is located between the shafts 16 and 30, rather than locating the shaft 16 between the shaft 30 and the pin 24. One advantage of this embodiment is that the shaft 16 of the device to be rotated may be located at a remote point from the tuning knob 36 and gear section 28, by extending the length of the lever arm 26 and the slotted member 18. This embodiment is best adapted to drive a device through an angular displacement of less than 90° and preferably from 0° to approximately 75°. Within this range the angular velocity imparted to the device would be variable from 0°, the position shown in Fig. 4, to approximately 75°, while turning the knob 36 at a constant angular velocity. An extension arm 50 is provided on the gear section 28 and by suitably adjusting the length of this arm relative to the length of the link 44, the pointer can be made to indicate approximately 170° without experiencing "dead spots" while the shaft 16 rotates 75° clockwise from the position shown in Fig. 4.

If desired, the device of Fig. 4 can be modified to produce approximately 75° of rotation in either direction about the position shown and to indicate any desired angular dial coverage by proper proportioning of the length of the link 44 and the extension arm 50. By such modification, the angular rotation of the shaft 16 and slotted member 18, for a given angular rotation of the knob 36, will be greatest in the position shown in Fig. 4, which will then be the center position. As the shaft 16 rotates on either side of this center position toward either extreme position, the angular rotation imparted to the shaft will then be progressively smaller for a given constant rate of angular velocity of the knob 36.

While I have shown and pointed out my invention as applied above, it will be apparent to those skilled in the art that many modifications can be made within the scope and sphere of my invention.

What is claimed is:

1. Apparatus for changing the position of a device secured to a first shaft and rotatable about the axis of said shaft, and for indicating the position of said device with respect to an initial position comprising, a slotted member secured to said first shaft with the slot thereof extending in a direction substantially perpendicular to said first shaft and displaced to one side thereof, a second shaft substantially parallel to and out of alinement with said first shaft, a gear section supported by and rotatable about the axis of said second shaft and a driving gear for rotating said gear section, a pin carried by said gear section protruding above the surface of said gear section and extending in the direction of said second shaft and being engaged by said slot, said pin being constrained to move in said slot only in the direction in which said slot extends as said pin rotates with said gear section by the action of said driving gear to drive said slotted member, said first shaft and said device, a dial, and a pointer associated with said dial and fixed to said gear section to indicate in conjunction with said dial the angular position of said device with respect to its initial position.

2. Apparatus for changing the position of a device secured to a first shaft and rotatable about the axis of said shaft, and for indicating the position of said device with respect to an initial position comprising, a slotted member secured to said first shaft with the slot thereof extending in a direction substantially perpendicular to said first shaft and displaced to one side thereof, a second shaft being substantially parallel to and out of alinement with said first shaft, a gear section supported by and rotatable about the axis of said second shaft and a driving gear for rotating said gear section, said gear section having thereon a lever arm extending generally outwardly from said second shaft, said lever arm carrying a pin protruding above the surface of said arm and extending in the direction of said second shaft and being engaged by said slot, said pin being constrained to move in said slot only in the direction in which said slot extends as the pin on said lever arm rotates with said gear section by the action of said driving gear to drive said slotted member, said first shaft and said device, a dial, and a pointer associated with said dial and linked to said device to indicate in conjunction with said dial the angular position of said device with respect to its initial position.

3. Apparatus for changing the position of a device secured to a first shaft and rotatable about the axis of said shaft, and for indicating the position of said device with respect to an initial position comprising, a slotted member secured to said first shaft with the slot thereof extending in a direction substantially perpendicular to said first shaft and displaced to one side thereof, a second shaft being substantially parallel to and out of alinement with said first shaft, a gear section supported by and rotatable about the axis of said second shaft and a driving gear for rotating said gear section, said gear section having thereon an extension arm extending generally outwardly from said second shaft, and also having a lever arm extending generally outwardly from said second shaft and carrying a pin protruding above the surface of said lever arm and extending in the direction of said second shaft and being engaged by said slot, said pin being constrained to move in said slot only in the direction in which said slot extends as the pin on said lever arm rotates with said gear section by the action of said driving gear to drive said slotted member, said first shaft and said device, a dial, and a pointer associated with said dial and linked to said device, whereby when constant velocity angular motion is imparted to said driving gear, said device will be rotated at a progressively changing velocity, and the angular position thereof with respect to its initial position will be indicated on the dial by said pointer.

4. In combination, a variable tuning condenser having a rotor; a first shaft fixed to the rotor of said variable tuning condenser; a second shaft parallel to said first shaft and displaced therefrom in a direction perpendicular to the axes of said shafts; a gear section fixed to said second shaft and adapted to rotate said second shaft; a driving gear in operative engagement with said gear section for driving the gear section; an arm integral with said gear section and extending in a direction perpendicular to the axis of said second shaft; a pin; an arm carried by and fixed to said first shaft, said last mentioned arm being perpendicular to the axis of said first shaft, one of said arms being slotted and the other of said arms carrying said pin, said arms being in pin and slot engagement; a dial; a pointer movable over said dial; and means for linking said pointer to said gear section so as to indicate on said dial the angular position of said rotor, the arrangement being such that when said second shaft is driven at constant angular velocity, the first shaft and said rotor are driven at a variable angular velocity.

5. In combination, a rotatable element; a first shaft carrying said rotatable element; a second shaft parallel to said first shaft and displaced therefrom in a direction perpendicular to the axes of said shafts; a gear section fixed to said second shaft and adapted to rotate said second shaft; a driving gear in operative engagement with said gear section for driving the same; an arm integral with said gear section and extending in a direction perpendicular to the axis of said second shaft; a pin; an arm carried by and fixed to said first shaft, said last mentioned arm being perpendicular to the axis of said first shaft, one of said arms being slotted and the other of said arms carrying said pin, said arms being in pin and slot engagement; a dial; a pointer movable over said dial, and means for moving said pointer with movement of said gear section so as to indicate on said dial the angular position of said element, the arrangement being such that when said second shaft is driven at constant angular velocity, the first shaft and said element are driven at a variable angular velocity.

References Cited in the file of this patent

UNITED STATES PATENTS

| | | |
|---|---|---|
| 1,810,353 | Kingsford et al. | June 16, 1931 |
| 1,871,876 | Brehang | Aug. 16, 1932 |
| 2,231,609 | Anderson | Feb. 11, 1941 |

FOREIGN PATENTS

| | | |
|---|---|---|
| 937,233 | France | Oct. 11, 1948 |